United States Patent

[11] 3,588,707

[72] Inventor Roger Alan Manship
Stortford, England
[21] Appl. No. 763,871
[22] Filed Sept. 30, 1968
[45] Patented June 28, 1971
[73] Assignee International Standard Electric Corporation
New York, N.Y.
[32] Priority Oct. 25, 1967
[33] Great Britain
[31] 48467/67

[54] VARIABLE DELAY CIRCUIT
10 Claims, 2 Drawing Figs.

[52] U.S. Cl. .......... 328/55, 328/72, 328/110
[51] Int. Cl. .......... H03k 5/159
[50] Field of Search .......... 328/55, 56, 72, 110; 333/28, 28 (A), 28 (B), 72 (T) (Inquired)

[56] References Cited
UNITED STATES PATENTS

| | | | |
|---|---|---|---|
| 3,204,180 | 8/1965 | Bray et al. .......... | 333/70X |
| 3,268,836 | 8/1966 | Linke .......... | 333/28X |
| 3,400,332 | 9/1968 | O'Neill et al. .......... | 333/28X |

*Primary Examiner*—John S. Heyman
*Attorneys*—C. Cornell Remsen, Jr., Walter J. Baum, Percy P. Lantzy, Philip M. Bolton, Isidore Togut and Charles L. Johnson, Jr.

ABSTRACT: An automatic variable digital delay circuit to compensate a digital signal for variable delays in networks employing TDM channels. The circuit includes a first shift register in which the sync pulse of the input pulse train is stepped therethrough at a given rate. The output of each shift register stage is gated with a local sync pulse. The stage that is "on" when local sync pulse occurs identifies the delay necessary to achieve sync. This delay is obtained by passing the entire pulse train through a second identical shift register and taking the output from the stage thereof corresponding to the stage of the first shift register identifying required delay.

Fig. 2.

Inventor
ROGER A. MANSHIP
By Alfred C. Hill
Agent

Inventor
ROGER A. MANSHIP
By Alfred C. Hill
Agent

VARIABLE DELAY CIRCUIT

BACKGROUND OF THE INVENTION

This invention relates to time division multiplex (TDM) systems and more particularly to a variable delay circuit employed therein.

One application of such a circuit is to provide compensation for the variable propagation velocities in long looped networks with TDM channels where it is essential to maintain the phase of the channels. This can be done by delaying the signals to make the total delay equal to an integral number of frames.

SUMMARY OF THE INVENTION

An object of the present invention is to provide a variable digital delay circuit to compensate for variable propagation velocities or delays in TDM networks.

A feature of the present invention is the provision of a variable digital delay circuit comprising a first source of input signal including a sync signal; first means including first tapped delay means coupled to the first source responsive to the sync signal; a second source of reference signal; second means coupled to the taps of the first delay means and the second source to detect time coincidence between the sync signal and the reference signal; second tapped delay means coupled to the first source responsive to the input signal; and third means coupled to the second means and the second delay means responsive to the time coincidence in said second means to extract from the tap of the second delay means, corresponding to the tap of the first delay means where the time coincidence occurs, the delayed input signal.

Another feature of the present invention is the provision of similar first and second digital shift registers employed as the above-mentioned first and second tapped delay means, coincidence gates, employed as the above-mentioned second means, for each stage of the first register and the reference signal, and logic gating means, employed as the above-mentioned third means, responsive to the coincidence gating for extracting from one stage of the second register the contents thereof.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
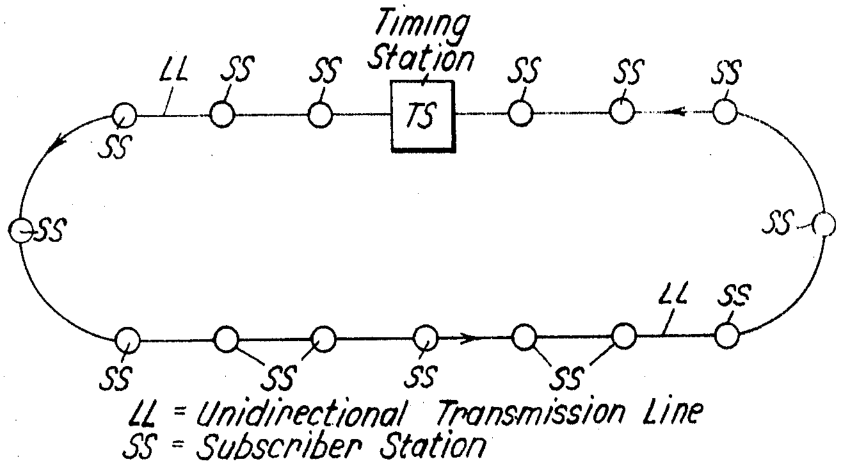
FIG. 1 is a diagrammatic illustration of the layout of a single loop network incorporating the present invention.

The basic network is shown in FIG. 1 and consists of a number of subscriber stations SS connected to one another by unidirectional transmission line LL connected in a closed loop. The loop includes timing station TS the function of which is to provide a number of TDM channels in the loop. Each subscribe station SS has access to any unused channel for the purpose of making a connection and each subscriber station is responsive to its unique identification signal appearing on any channel to cause a connection to be completed. Once a channel has been seized for a particular connection it is retained by that connection until the connection is terminated and it is not available for any other subscriber stations. A description of the network including the components of stations SS and TS and the operation thereof is presented in the U.S. copending application of D. L. Thomas, Ser. No. 763,874, filed Sept. 30, 1968.

A prime function of the timing station is to provide not only the TDM channels and synchronizing signals for the loop but also to compensate for the propagation time in the loop. To do this it incorporates the variable digital delay shown in FIG. 2.

It is a variable delay because the propagation time may vary, for example, due to temperature variations. In the case of a loop involving several hundreds or thousands of feet of cable such variations in propagation time assume great importance, since to make efficient use of the system high speed bit rates are necessary and consequently accurate synchronizing is also necessary. The delay circuit is permanently in the line input to timing station TS.

Figure 2:
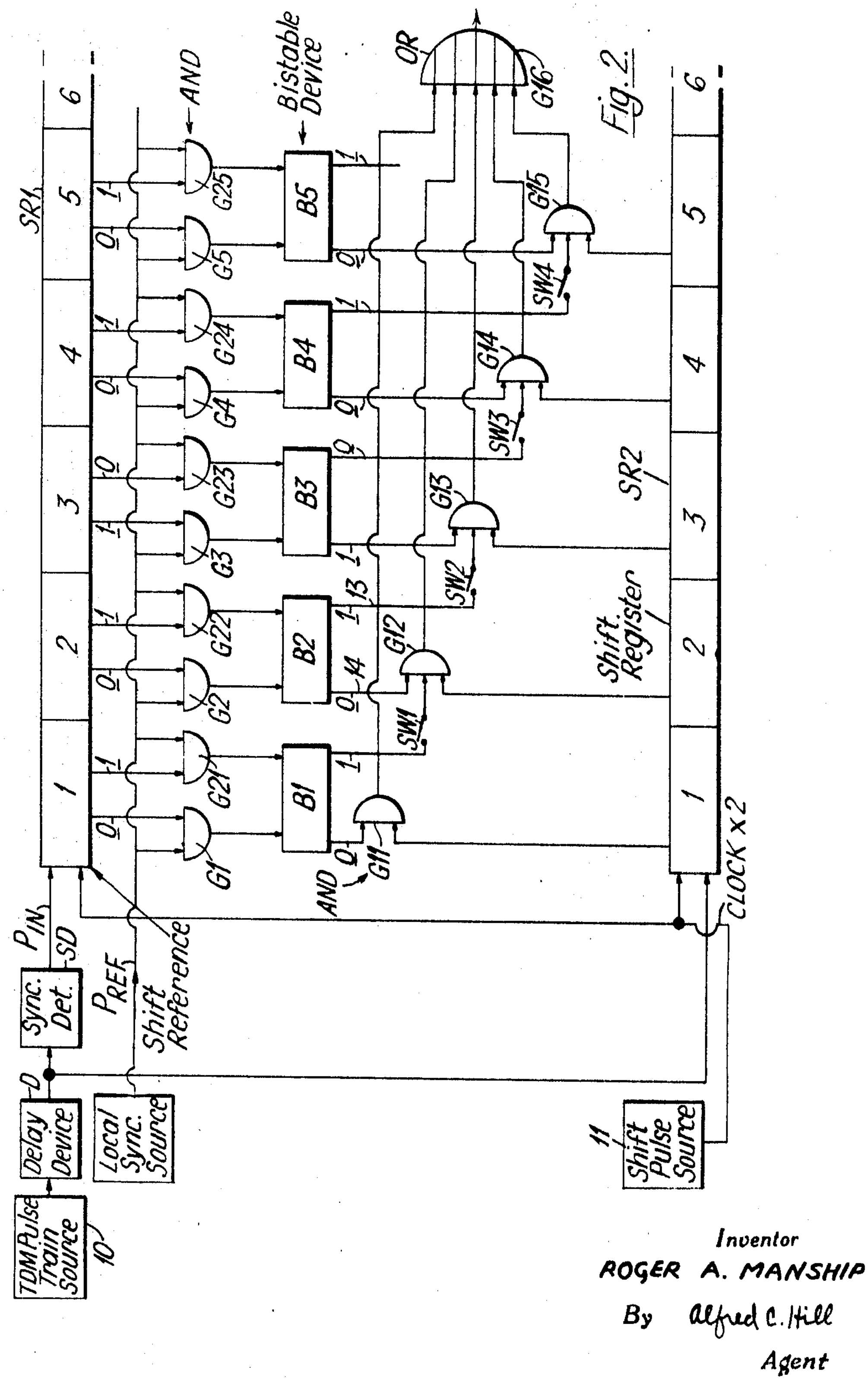
FIG. 2 is a block diagram of a variable digital delay using shift registers in accordance with the principles of the present invention.

Before describing the circuit of FIG. 2, it should be mentioned that timing station TS also includes a digital pattern generator connected to the line by switches which is responsible for generating the synchronizing signals and empty channel signals. During the synchronizing period and for any empty channel periods the line is terminated by a resistance. Thus, signals generated by the pattern generator are discarded after one circuit of the loop. On the other hand signals generated by subscriber stations must not be lost. Therefore, when a channel is not empty the timing station is shorted out by switches for the duration of that channel, thereby, allowing those signals to reach subscriber stations beyond the timing station.

To determine the amount of delay required, a pulse is derived corresponding to a specific point on the incoming line information (TDM pulse train). This pulse is delayed in a shift register until it is coincident with a similar pulse derived from the timing station's reference of sync signal. This gives a measure of the delay required, and this delay is applied to the line information in a second shift register.

The line information (TDM pulse train) from source 10 is initially delayed by a preset fixed amount in delay device D. A pulse $P_{IN}$ is then derived using synchronizing (sync) channel detector SD. Detector SD produces a pulse immediately after the unique code of the sync channel. This pulse is then fed into shift register SR1 driven by a waveform at the output of shift pulse source 11 derived from a master clock but at twice the clock frequency. The outputs of the stages of shift register SR1 are compared with a pulse $P_{REF}$ from local sync source 12 derived from the sync signal appearing at the output of the timing station's pattern generator. This comparison is executed in AND gates G1—G5, and one of these delivers an output indicating time coincidence between reference pulse $P_{REF}$ and pulse $P_{IN}$ after some delay. AND gates G1—G5 are used to set bistable devices B1—B5 and whichever bistable is set by its AND gate will then hold that particular delay setting for one complete frame. The bistable devices in turn control the tapping off of line information from the same stage of a second shift register SR2, whose input is coupled to source 10 by delay device D via AND gates G11—15 and OR gate G16. Thus, if gate G3 indicates time coincidence between $P_{IN}$ in stage 3 of register SR1 and $R_{REB}$, then B3 is set and opens G13. The contents of stage 3 of register SR2 are then tapped off and fed into the loop on the outgoing side of the timing station via OR gate G16.

If the delay changes, a second set of AND gates G21—G15 is needed to reset the bistable device set by the previous delay. For example, suppose that $P_{REF}$ coincides with $P_{IN}$ in stage 3 of register SR1. Each stage of register SR1 is arranged to give a direct and an inverted output. For stage 1, 2, 4, 5 etc. the outputs are, respectively, binary conditions 0 and 1, since $P_{IN}$ has either already passed through them or has not reached them. Stage 3, which holds $P_{IN}$, gives outputs of 1 and 0, respectively. The bistable devices respond to the 1 condition only, so that B1, B2, B4, B5 etc. are in the reset condition and do not open gates G11, G12, G14, G15 etc. Bistable device B3 is in the set condition and opens AND G13. If the delay increases so that the time coincidence is now detected by AND G4, then bistable device B4 is set by AND G4. However, stage 3 of register SR1 now gives outputs of 0 and 1, respectively, and AND G23 resets bistable device B3.

It is possible that $P_{IN}$ is just narrower or wider than its correct width, and this could prevent $P_{IN}$ from going into the shift register, or cause it to go into two stages. To overcome this $P_{IN}$ can be made wider than a normal single pulse, so that for certain delays it will go into two stages of the shift register. Additional signal paths from bistable devices B1, B2, B3, B4, etc., respectively, to AND's G12, G13, G14, G15, etc. are provided by closing switches SW1, SW2, SW3, SW4, etc., then ensure that only one output is possible from shift register SR2 by gating out the unwanted output from register SR1. For, instance, assume that $P_{IN}$ is wide enough to be present in both stage 2 and 3 of register SR1. This condition will cause bistable devices B2 and B3 to be set resulting in a 1 0 output from device B2 (opposite to that shown) and a 1 0 output from device B3 (same as shown). The 0 on conductor 13 is coupled through closed switch SW2 which will render AND G13 inoperative thereby preventing coupling of line information from stage 3 of register SR2. However, the 1 on conductor 14 together with the 1 from device B1 through switch SW1 will permit the line information to be extracted by AND G12 from the second stage of register SR2.

By driving the shift registers SR1 and SR2 from the outgoing clock for the pattern generator phase variations between incoming and outgoing signals are compensated for.

While I have described above the principles of my invention in connection with specific apparatus, it is to be clearly understood that this description is made only by way of example and not as a limitation to the scope of my invention as set forth in the objects thereof and in the accompanying claims.

I claim:

1. A variable digital delay circuit comprising:

a first source of information bearing input signal including a sync signal;

first means including first tapped delay means coupled to said first source responsive to only said sync signal;

a second source of reference signal for said sync signal;

second means coupled to the taps of said first delay means and said second source to detect time coincidence between said sync signal and said reference signal;

second tap delay means coupled to said first source responsive to said input signals; and third means coupled to said second means and said second delay means responsive to said time coincidence in said second means to extract from the tap of said second delay means, corresponding to the tap of said first delay means where said time coincidence occurs, the delayed input signal.

2. A circuit according to claim 1, wherein said first source includes a fixed delay device.

3. A circuit according to claim 1, wherein said first means further includes means coupled to said first source to detect said sync signal for application of said sync signal to the input of said first delay means.

4. A circuit according to claim 1, wherein said second means includes coincidence gate means coupled to each tap of said first delay means and said second source.

5. A circuit according to claim 1, wherein said third means includes logic means coupled to said second means and each tap of said second delay means.

6. A circuit according to claim 5, wherein said logic means includes bistable means coupled to said second means; and coincidence gate means coupled to said bistable means and each tap of said second delay means.

7. A circuit according to claim 6, wherein said coincidence gate means further includes means coupled to an adjacent one of said bistable means to insure that said input signal is extracted from only said tap of said second delay means.

8. A circuit according to claim 1, wherein said second source includes a source of locally generated sync pulse to function as said reference signal.

9. A circuit according to claim 1, wherein said first delay means includes a first digital shift register; and said second delay means includes a second digital shift register similar to said first register.

10. A circuit according to claim 9, wherein said second means includes a first plurality of AND gates each coupled to each of the 0 and 1 outputs of each stage of said first register; said third means includes a plurality of bistable devices each coupled to said AND gates coupled to one of the stages of said first register, a second plurality of AND gates each coupled to one of said bistable devices and one stage of said second register, and an OR gate coupled to each of said second plurality of AND gates.